(12) United States Patent
Suzuki

(10) Patent No.: US 6,857,574 B2
(45) Date of Patent: Feb. 22, 2005

(54) LOADING MECHANISM OF STORAGE DEVICE

(75) Inventor: Takeshi Suzuki, Yamagata (JP)

(73) Assignee: NEC Corporation, Tokyo (JP)

( * ) Notice: Subject to any disclaimer, the term of this patent is extended or adjusted under 35 U.S.C. 154(b) by 139 days.

(21) Appl. No.: 10/122,330

(22) Filed: Apr. 16, 2002

(65) Prior Publication Data
US 2002/0148903 A1 Oct. 17, 2002

(30) Foreign Application Priority Data
Apr. 17, 2001 (JP) ........................................ 2001-117639

(51) Int. Cl.[7] .......................... G06K 13/04; G06K 13/00
(52) U.S. Cl. ...................................... 235/479; 235/475
(58) Field of Search .................................. 235/475, 479

(56) References Cited

U.S. PATENT DOCUMENTS

| | | | | |
|---|---|---|---|---|
| 5,663,850 A | * | 9/1997 | Nakanishi et al. | 360/98.06 |
| 5,805,552 A | * | 9/1998 | Tozune et al. | 369/75.1 |
| 5,943,185 A | * | 8/1999 | Bracken et al. | 360/99.06 |
| 5,966,268 A | * | 10/1999 | Nicklos | 360/99.06 |
| 6,144,629 A | * | 11/2000 | Kurita et al. | 369/77.2 |
| 6,434,101 B1 | * | 8/2002 | Shinoda | 369/77.2 |
| 6,512,728 B1 | * | 1/2003 | Nasu et al. | 369/75.2 |
| 6,621,657 B1 | * | 9/2003 | McCormack et al. | 360/96.5 |

FOREIGN PATENT DOCUMENTS

| | | |
|---|---|---|
| JP | 2-177051 | 7/1990 |
| JP | 4-186576 | 7/1992 |
| JP | 5-109166 | 4/1993 |
| JP | 6-28751 | 2/1994 |
| JP | 2821076 | 8/1998 |

* cited by examiner

*Primary Examiner*—Daniel Stcyr
*Assistant Examiner*—April Taylor
(74) *Attorney, Agent, or Firm*—McGinn & Gibb, PLLC

(57) ABSTRACT

A loading mechanism of a storage device includes a loader tray into which cartridge is loaded. A stopper spring is arranged on an opening of the loader tray. One side of the stopper spring is attached onto the loader tray, and the stopper spring is bent so as to include an engagement portion in a "V-like" shape. A pair of extending portions, extending toward the stopper spring, are formed on a side of a release plate. If the release plate is moved toward the stopper spring, the pair of extending portions move underneath an inclined portion of the stopper spring, so as to push up the engagement portion.

29 Claims, 6 Drawing Sheets

LOADING MECHANISM OF STORAGE DEVICE

BACKGROUND OF THE INVENTION

1. Field of the Invention

The present invention relates to a loading mechanism of a storage device, and, more particularly, to a loading mechanism for loading/unloading a cartridge into/from a predetermined position of a storage device in order to write/read information onto/from a storage medium, such as a magnetic tape, etc. contained in the cartridge.

2. Description of the Related Art

Many computer systems employ a magnetic tape device as a storage device. The magnetic tape device loads/unloads a cartridge including a magnetic tape into a loader tray of a loader section, thereby writing/reading information onto/from the magnetic tape. The loader section has a function for rewinding/unloading the magnetic tape after setting the cartridge contained in the loader tray into a predetermined position of the magnetic tape device. The magnetic tape device includes a detector, having various sensors, a magnetic head, and a driving section for moving a loader tray, etc.

The magnetic tape device serves as a library device, an autochanger device, a manual-changer device or the like, depending on its usage purpose. In accordance with the usage purpose of the magnetic tape device, the magnetic tape device is designed in accordance with whether a cartridge holder (or a projection preventing section) for stably fixing the cartridge into the magnetic tape device is attached thereto.

In the library device a carrier member (e.g. a hand, etc.) holds a specified cartridge and inserts the held cartridge into the loading mechanism, from a storage box containing a plurality of cartridges. Hence, in the case where the magnetic tape device is used as a library device, it is necessary that the loading mechanism include a cartridge holder holding a cartridge, and hence preventing the cartridge from coming out from the loading mechanism by an effect of an external factor (e.g. an earthquake).

The autochanger device includes one or two loader sections that are stably fixed therein. A magazine containing the plurality of cartridges approaches the cartridge attachment section of each loader section. Thus, in the case where the magnetic tape device is used as an autochanger devices it does not need the cartridge holder.

Accordingly, it is quite troublesome to change the design of the magnetic tape device only in accordance with whether the cartridge holder is included. In consideration of this, the cartridge holder is designed to be attachable/detachable to/from a magnetic tape device, so that the cartridge holder can be attached/detached to/from the magnetic tape device, in accordance with its usage.

Conventionally, in many magnetic tape devices, a cartridge is loaded into a cartridge holder, or a plurality of cartridges are contained in a magazine. In this structure of the magnetic tape devices, a cartridge may come out from a cartridge holder or a magazine by an effect of an external factor, such as an earthquake, the carriage, or the like. Thus, the loader section or magazine is so designed that the cartridge does not come therefrom.

For example, Unexamined Japanese Patent Application KOKAI Publications Nos. H2-177051 and H5-109166 disclose the structure of a magnetic tape device, a push rod or stopper is engaged with a cartridge, and the push rod or stopper moves in accordance with the movement of the cartridge at the time of unloading the cartridge into the magnetic tape device.

Unexamined Japanese Patent Application KOKAI Publication No. H4-186576 discloses the structure of a magnetic tape device, wherein a projection preventing section is set on the magazine, a position determining groove is arranged on the side surface of the cartridge and the cartridge is contained inside the magazine. In this structure, the top of the projection preventing section is fit into the position determining groove, so that the cartridge is prevented from coming out therefrom.

Unexamined Japanese Patent Application KOKAI Publication No. H6-28751 discloses the structure of a magnetic tape device. In this structure, prepared on the ceiling surface of a cartridge cell are an upper stopper, which is, a plate-spring type stopper, and a stopper guide, which is formed in a plate-like shape and forces the upper stopper to come out from the side surface of the cartridge at the time of unloading the cartridge. When unloading the cartridge from the cartridge cell, if the cartridge holder reaches a predetermined position, the stopper guide moves toward the upper stopper in the face of the elastic force in the movement of the cartridge holder. Further, the stopper guide pushes up the upper stopper, thereby blocking the stopper function Japanese Patent No. 2821076 discloses the structure of a cartridge library device. In this structure, the back side of a cartridge, which has improperly been loaded into a magazine, has an extending section which extends more than the back side of a cartridge which has properly been loaded into the magazine. According to this structure, an operator of the cartridge library device can easily be aware of the improper loading of the cartridge. If the cartridge is improperly loaded into the magazine, there will be made a space behind the cartridge because of the extending section of the cartridge. The arm arranged behind the cartridge rotate at an angle of 90°, and its rotating shaft gets down together with the movement of this arm. If the rotating shaft interrupts a transmitted light of an optical sensor, a detection signal is generated. Upon generation of this detection signal, a warning is given to the operator, so as to let the operator know about the improper loading of the cartridge.

However, the above-described structures are efficient for some usage, but not for various usage purposes. For example, in the case where the magnetic tape device is used as a library device and an autochange device, the projection preventing section can not be blocked, so that the magnetic tape device can not be used for various usage purposes.

Even through the conventional loading mechanism or magazine is so designed that the magnetic tape device can be used for various usage purposes, the loader section is necessary in the case of the library device, while no loader section is necessary in the case of the autochanger device. In accordance with the usage purpose of the magnetic tape device, it is necessary to attach/detach the loader section to/from the magnetic tape device. The attachment/detachment of the loader section needs to be achieved manually by someone. Further, the loader section needs to be managed. Additionally, because the conventional magnetic tape device can not satisfactorily cause the easy designing of the storage device and the general use thereof, the personnel expenses, the management cost, and the device cost ran up to a large sum.

SUMMARY OF THE INVENTION

The present invention has been made in consideration of the above. It is accordingly an object of the present invention to provide a loading mechanism which can control a cartridge loading section to function or not to function, in accordance with the usage purpose of a storage device including the loading mechanism therein.

Another object thereof is to provide a loading mechanism of a storage device, which can easily manage a cartridge loading section included therein.

Still another object thereof is to provide a loading mechanism of a storage device, which can cause easy designing of the storage device and general use of the storage device.

In order to attain the above objects, according to the first aspect of the present invention, there is provided a loading mechanism of a storage device, comprising:

a loader tray which loads a cartridge containing at least one storage medium, thereinto, and has an opening from which the cartridge appears in a state wherein the cartridge is loaded thereinto;

an engagement member which is formed in the opening, has one side fixed onto the loader tray, and includes an engagement portion to be engaged with the cartridge between the one side and other side thereof;

a movable member which is movable toward and from the engagement member, and causes the engagement portion to be moving toward the engagement member so as to be separated from the cartridge; and a fixing member which fixes the movable member in a predetermined position of the loader tray.

It is preferred that:

the engagement member have an inclined portion on the other side; and the movable member move toward the engagement member, so as to push up the inclined portion of the engagement portion, thereby separating the engagement portion from the cartridge.

It is preferred that the engagement member be bet in such a form having an engagement portion and an inclined portion.

It is preferred that the engagement member be formed of an elastic material at least in a range from the engagement portion to the one end.

It is preferred that the engagement member be formed of a plate spring.

It is preferred that a pair of extending portions, to be engaged with the movable member, be formed on the other side of the engagement member.

It is preferred that a pair of extending portions, to be engaged with respectively the pair of extending portions of the engagement member, are formed on the one end of the movable member.

It is preferred that the loading mechanism further comprise a position determining member which enables the movable member to move only in one direction It is preferred that the position determining member comprise:

at least one long hole which is formed in the movable member and formed in parallel with a movement direction of the movable member; and at least one extending portion which is formed in the loader tray and is engaged with the at least one long hole.

It is preferred that the fixing member comprise:

at least one bole which is formed in the movable member in parallel with a movement direction of the movable member; and a screw which is affixed onto the loader tray and with which the movable member is held tight through the at least one long hole.

It is preferred that the fixing member comprise:at least one hole which is formed in We movable member in parallel with a movement direction of the movable member; and a screw which is attached onto the loader tray and which is used for fixing the movable member through the at least one long hole.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will now be explained with reference to the accompanying drawings.

Figure 1:
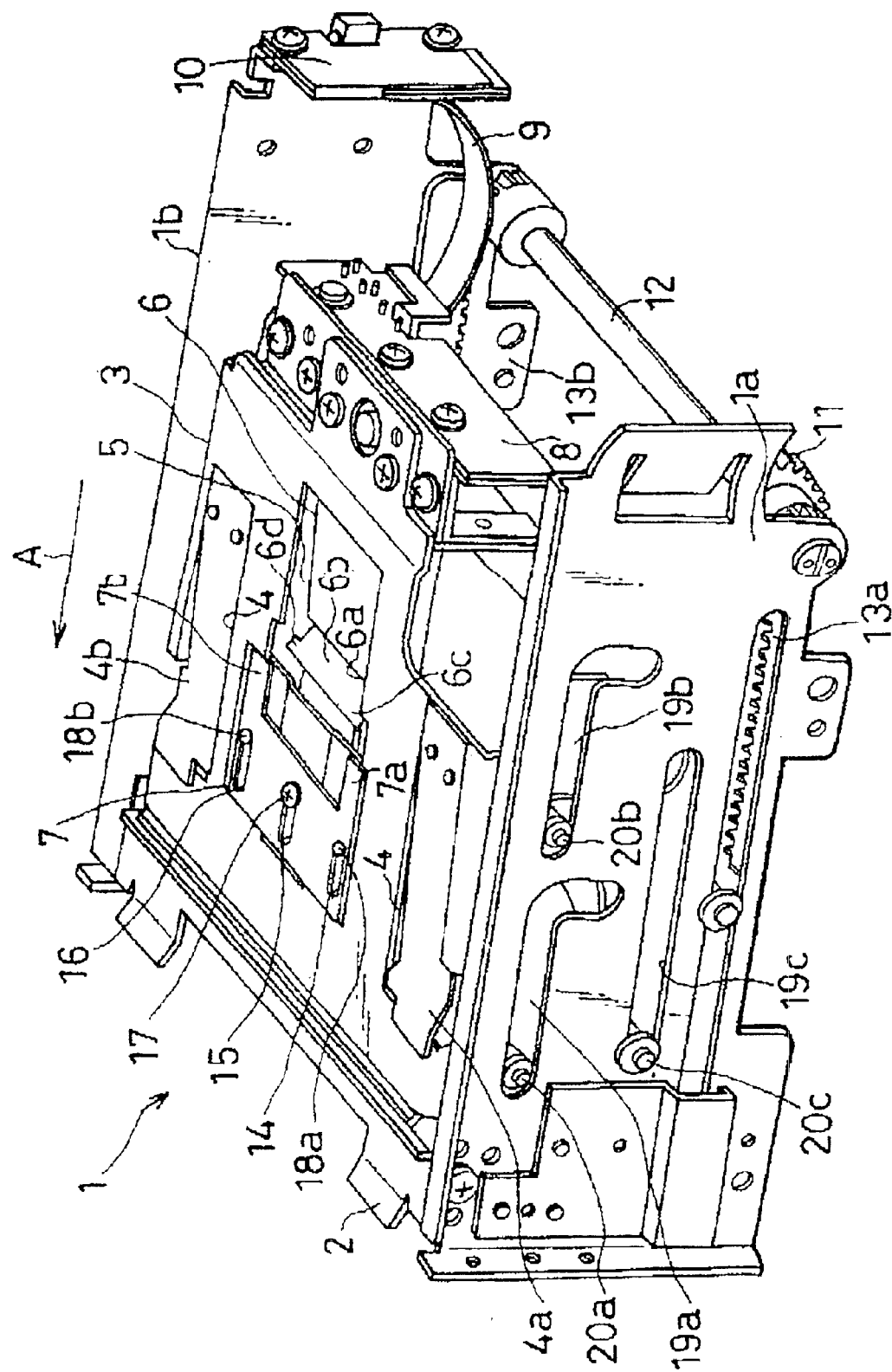
FIG. 1 is a perspective diagram showing a primary portion of a loading mechanism of a storage device, wherein a loading section of the loading mechanism is operated.

FIG. 1 is a perspective diagram showing a loading mechanism for loading a storage device. FIG. 1 shows a driving device included in a storage device, and shows also the structure of a loading mechanism for loading this driving device. In FIG. 1, for the sake of simple illustration of the loading mechanism, the casing of the loading mechanism is not shown. FIG. 1 shows also a state of the storage device, wherein a loading section of the loading mechanism which holds a cartridge in the storage device is operated.

Figure 2:
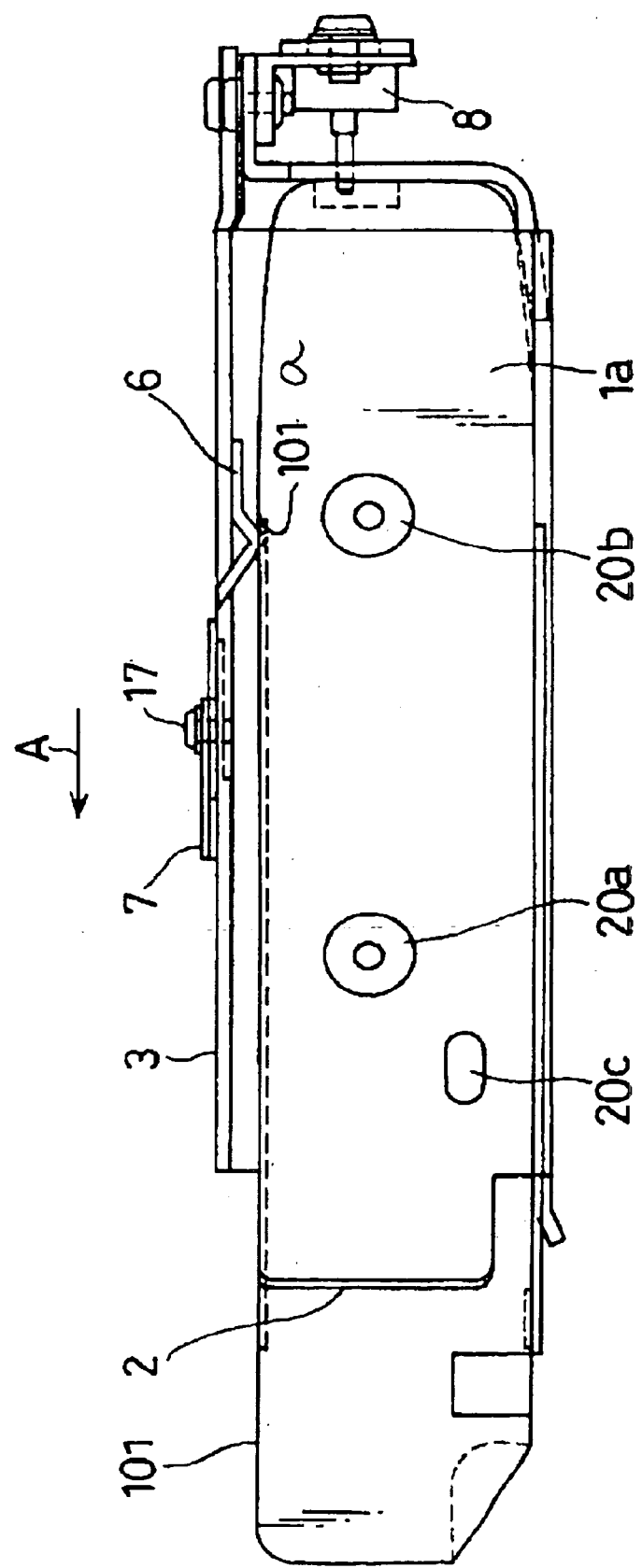
FIG. 2 is a side view showing a state of the storage device, wherein a cartridge is loaded into the loading mechanism of FIG. 1.

FIG. 2 shows a state of the storage device, wherein a cartridge is loaded into the loading mechanism.

Figure 3:
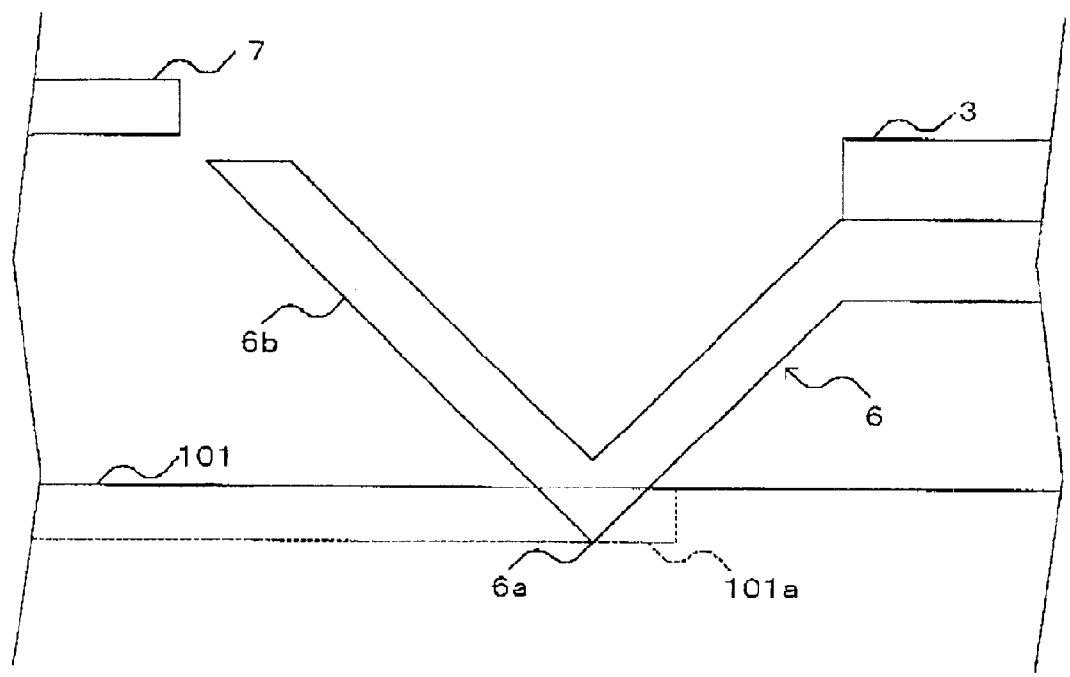
FIG. 3 is an enlarged view showing an area around a stopper spring shown in FIG. 2.

FIG. 3 is an enlarged view showing the peripheral section of a stopper spring included in the loading section.

Explanations will now be made to the loading mechanism of the storage device, in the state wherein the loading section is operated.

As shown in FIG. 1, the loading mechanism 1 of the storage device includes side panels 1a and 1b and a front panel 2. The side panels 1a and 1b and the front panel 2 arc connected with each other so as to be in a "U-like" shape using bolts so as to form a casing of a cartridge 101, as seen from FIG. 1A loader tray 3 is prepared inside the casing.

The internal size of the loader tray 3 corresponds to the size of the cartridge 101 so that the cartridge 101, containing a recording medium, such as a magnetic tape or the like, can be fit thereinto.

Recessed sections 4 are formed on the loader tray 3, in positions corresponding to the sides of the side panels 1a and 1b, respectively. Pressing members 4a and 4b are formed on the upper surface of the loader tray 3 so as to cover the recessed sections 4, respectively.

Each of the pressing members 4a and 4b is formed from a plate spring, for example, and one end thereof is fixed onto the upper surface of the loader tray 3. The other side of each of the pressing members 4a and 4b is bent. The other side of each of the pressing members 4a and 4b pressing the cartridge 101 loaded into the loader tray 3, so as to stably hold the cartridge 101. To addition, the other side of each of the members 4a and 4b is arranged on the upper surface of the loader tray 3, and serves as a stopper which prevents the bent portion of each pressing member 4a or 4b from pressing the cartridge 101 too hard.

An opening 5 is formed in the center (between the recessed sections 4) of the loader tray 3. As shown in FIG. 2, the opening 5 is formed in the upper end of a recess 101a included in the cartridge 101, in a state wherein the cartridge 101 is loaded into the loader tray 3. To cover the opening 5, there is prepared a stopper spring 6 serving as an engagement member.

The stopper spring 6 is formed of a plate spring, for example. One end of the stopper spring 6 is attached to the loader tray 3. The stopper spring 6 has an engagement portion which is bent to have a bottom portion 6a so as to be formed in a "V-like" shape. In this structure, the stopper spring 6 has an inclined portion 6b which inclines upward from the bottom portion 6a. The inclined portion 6b of the stopper spring 6 includes extending portions 6c and 6d which extend toward the side panels 1a and 1b, respectively. The extending portions 6c and 6d serve as guides for easily pushing up the inclined portion 6b upon being pressed by other extending portions 7a and 7b, respectively.

In the stopper spring 6, in the state wherein the cartridge 101 is loaded into the loader tray 3, the bottom portion 6a pushes the recess 101a and is engaged with the recess 101a so as to fix the cartridge thereon. If the extending portions 6c and 6d (the inclined portion 6b) are pushed by a release plate 7, the inclined portion 6b moves upward together with the bottom portion 6a, and hence separating the bottom portion 6a from the recess 101a.

Figure 4:
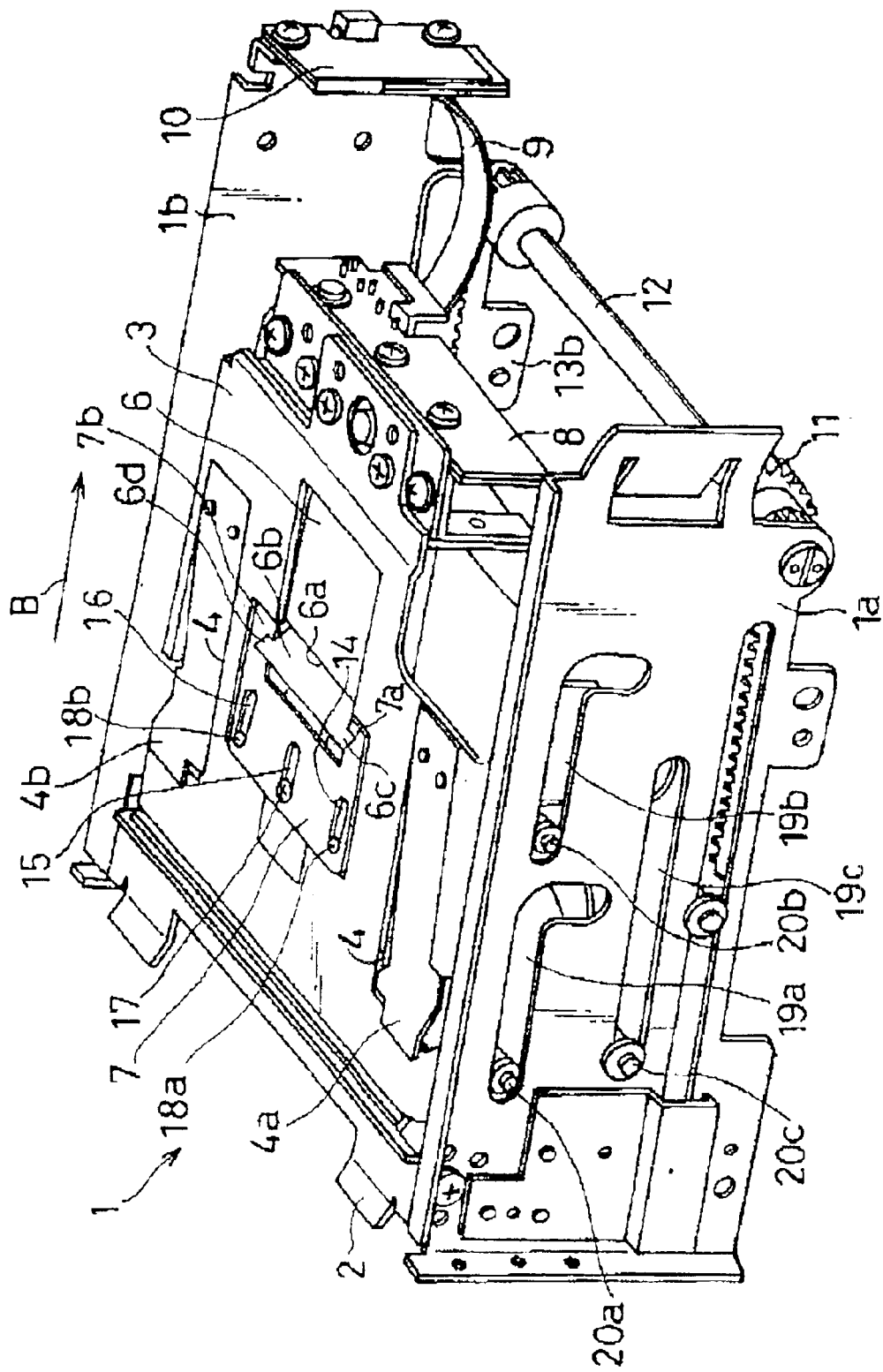
FIG. 4 is a perspective diagram showing the primary portion of the loading mechanism of the storage device, wherein the loading section of the loading mechanism is not operated.

The release plate 7 serving as a movable member is formed in an area of the upper surface of the loader tray 3 which is adjacent to the stopper spring 6. The release plate 7 is movable in the direction of the stopper spring 6. The extending portions 7a and 7b which extend toward the stopper spring 6 are formed on one side of the release plate 7 which is formed adjacent to the stopper spring 6, thereby forming the "U-like" shape of the release plate 7. The extending portions 7a and 7b are so set that their width, along the stopper spring 6 rather than the size panels 1a and 1b, is slightly smaller than the width of the extending portions 6c and 6d (the inclined portion 6b). If the release plate 7 is moved in the direction toward the stopper spring 6, the extending portions 6c and 6d (the inclined portion 6b) of the stopper spring 6 respectively overlap with the extending portions 7a and 7b of the release plate 7. In this state, the extending portions 7a and 7bmove to get under the inclined portion 6b, and push the bottom portion 6a upward. The extending portions 7a and 7b are engaged with respectively, as illustrated in FIG. 4, and hence maintaining the stopper spring 6 in such a position that the stopper spring 6 is entirely pushed upward. Such stopper spring 6 and the release plate 7 are the primary elements of the loading section.

Three long holes 14 to 16, having a predetermined length and elongated in the direction toward the stopper spring 6, are formed respectively in the center and both ends of the release plate 7, in this structure, a screw is prepared in one of those three long holes 14 to 16, i.e. the hole 15, for example. After the release plate 7 is moved into a predetermined position on the loader tray 3, the release plate 7 is screwed down tight thereon using a screw 17, thereby fixing the release plate 7. The long holes 14 and 16 have embossed parts 18a and 18b, respectively, The embossed parts 18a and 18b serve as guides for preventing the release plate 7 from moving in any direction other than the direction along elongated side of the long holes 14 to 16.

A sensor 8, determining whether the cartridge is loaded or determining whether the storage device is in a writing or reading mode, is formed on the back side of the loader tray 3. This sensor 8 is connected to a connector 10 through a flat cable 9.

There is arranged a gear 11, which gives driving force of a non-illustrative motor to the loader tray 3, underneath the sensor 8 and the loader tray 3. The gear 11 is attached to the side panel 1a, for example. A shaft 12, which gives the torque of the gear 11 to the side panel 1b, is attached to the gear 11. Racks 13a and 13b, which moves the loader tray 3 upon receipt of the torque of the gear 11, are prepared respectively on the side panels 1a and 1b. A non-illustrative controller is connected to the sensor 8 and the gear 11. The controller includes a microprocessor, process controller, etc., and outputs a control signal or the like to each of the above-described portions of the loading mechanism 1, so as to control the loading mechanism of the storage device.

"L-like" shape long holes 19a and 19b are formed in each of the side panels 1a and 1b. Guides 20a and 20b, which project from the side surface of the loader tray 3, are inserted into the long holes 19a and 19b, respectively. A long hole 19c is formed in each of the side panels 1a and 1b. A guide 20c, which projects from the side surface of the loader tray 3, is inserted into the long hole 19c.

According to such a structure, upon loading of the cartridge 101 into the loader tray 3, the loader tray 3 moves along the long holes 19a and 19b in accordance with the rotation of the gear 11. Thus, the loader tray 3 paralelly moves and get downward, and hence the magnetic tape can be pulled out from tie cartridge 101.

Procedures for writing/reading information onto/from a storage medium, such as the magnetic tape or the like contained in the cartridge 101, using the above-described loading mechanism 1 of the storage device, will now be described with reference to FIGS. 1 to 3.

The user of the storage device opens the non-illustrative top surface of the casing of the loading mechanism 1 or pulls the front panel 2 from the casing, so that the release plate 7 is exposed. After this, the user moves the release plate 7 in the direction of "A" (i.e. away from the stopper spring 6) as shown in FIG. 1, until the release plate 7 reaches the screw 17. In this state, the release plate 7 is screwed down on the loader tray 3 using the screw 17. At this time, the release plate 7 and the stopper spring 6 are not in contact with each other. Hence, the inclined portion 6b is in a position lower than the upper surface of the loader tray 3. In other words, the bottom portion 6a is in such a state that it can reach the upper surface of the cartridge 101.

After the user closes the upper surface of the casing of the loading mechanism, he/she loads the cartridge 101 in the loader tray 3 from the left-hand side of FIG. 1. After the cartridge 101 is successfully loaded on the loader tray 3, the cartridge 101 and the loader tray 3 stay in the position (the initial position) as shown in FIG. 2.

In this state, as illustrated in FIGS. 2 and 3, the bottom portion 6a is engaged with the recess 101a, and hence preventing the cartridge 101 from coming out from the loader tray 3. Further, the pressing members 4a and 4b press the cartridge 101 downward to fix the cartridge 101, so that the cartridge 101 stably stays in an appropriate position. The sensor 8 detects the loading of the cartridge 101 into the loader tray 3.

In the case where the storage device is instructed to write/read information onto/from the magnetic tape, the non-illustrative controller controls the sensor 8 to detect whether the cartridge 101 is loaded into the loader tray 3. Upon detection of that the cartridge 101 is loaded into the loader tray 3, the controller controls the non-illustrative motor to rotate. Upon this rotation of the motor, the loader tray 3 moves in a direction opposite to the direction "A" shown in FIGS. 1 and 2 and gets downward along the long holes 19, so that the cartridge 101 can stay in a predetermined stable position. The magnetic tape is pulled out from the cartridge 101 to the position of the magnetic head, to write/read information onto/from the magnetic tape.

If the writing/reading of information onto/from the magnetic tape is done, the controller sets the loader tray 3 (the cartridge 101) back into the initial position thereof Even in this state, the recess 101a is still engaged with the bottom position 6a, and hence preventing the cartridge 101 from the loader tray 3.

Figure 5:
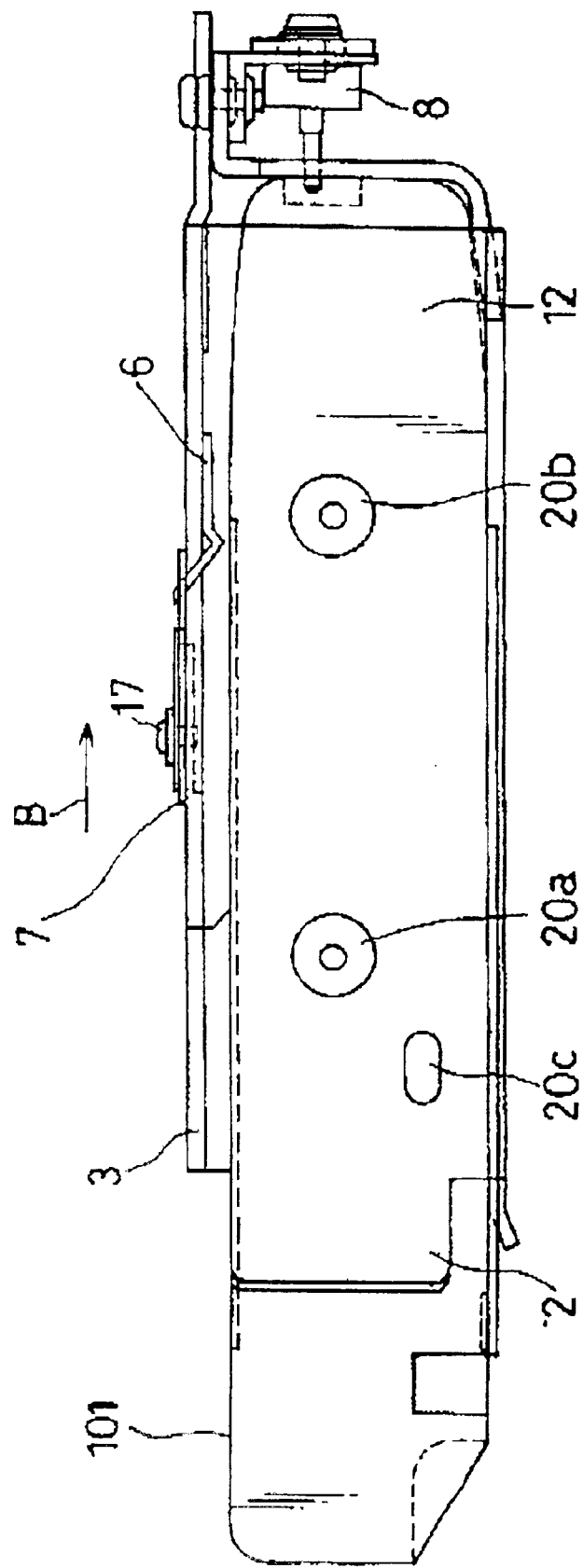
FIG. 5 is a side view showing a state of the storage device, wherein a cartridge is loaded into the loading mechanism of FIG. 4.
Figure 6:
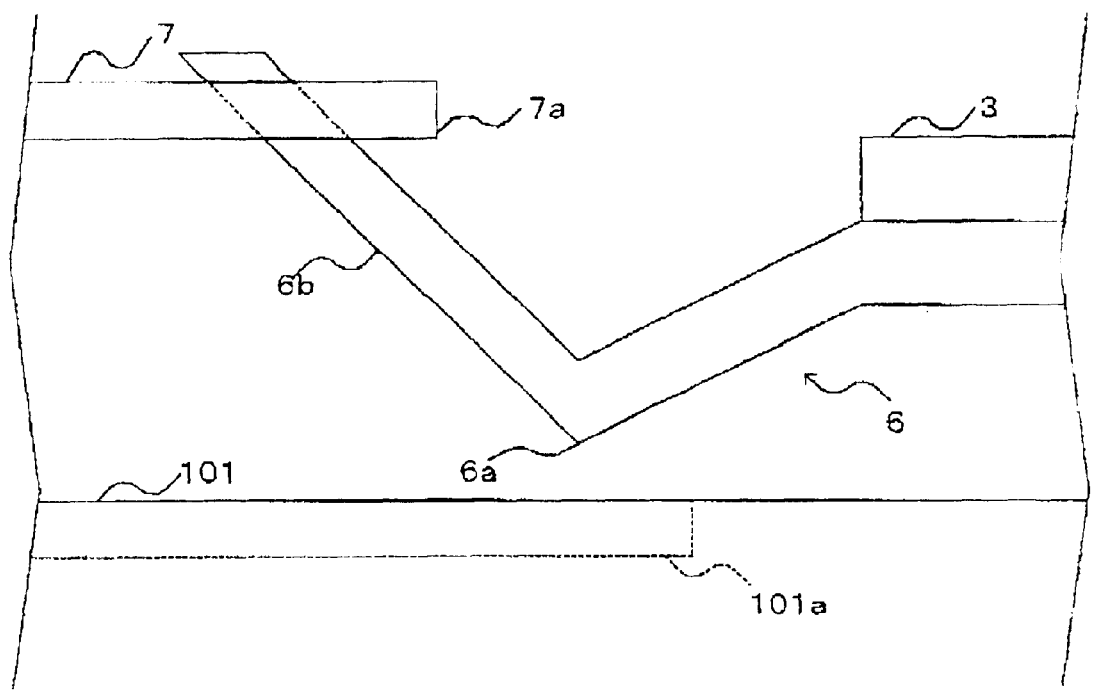
FIG. 6 is an enlarged view showing an area around a stopper spring shown in FIG. 5.

Explanations will now be made to the state where the loading section is not operated, with reference to FIGS. 4 to 6. FIGS. 4 to 6 show a state wherein the loading section shown in FIGS. 1 to 3 is not operated.

To set the loading section not to be operated, the user opens the top surface or the casing of the loading mechanism 1 so that the release plate 7 is exposed. The user loosens the screw 17 to move the release plate 7 in the direction of "B" as shown in FIG. 4, so as to set the release plate 7 in such a state that the front edge of the long hole 15 reaches (he screw 17. Subsequently, in this state, the user tightens the screw 17 so as to firmly set the release plate 7.

In this manner, if the release plate 7 is moved into the direction of "B", the extending portions 7a and 7b reach the inclined portion 6b. Immediately after this, the extending portions 7a and 7b slips underneath the inclined portion 6b so as to push up the bottom portion 6a. Hence, the inclined portion 6b is in a position higher than the upper surface of the loader tray 3. In other words, the bottom portion 6a can not push the upper surface of the cartridge 101.

After the user closes the top surface of the casing of the loading mechanism 1, the user loads the cartridge 101 into the loader tray 3 from the left-band side of FIG. 4. If the cartridge 101 is successfully loaded into the loader tray 3, the cartridge 101 and the loader tray 3 stably stay in their initial position as shown in FIG. 5.

In this state, as illustrated in FIG. 6, the bottom portion 6a is not engaged with the recess 101a, but instead, the bottom portion 6a stays away from the recess 101a. In this structure, the cartridge 101 is loosened.

In the case where the storage device is instructed to write/read information onto/from the magnetic tape, the loading section is not operated. Further, the nonillustrative controller controls the sensor 8 to detect whether the cartridge 101 is loaded into the loader tray 3, and controls also the motor to begin rotating. Upon rotation of the motor, the loader tray 3 moves in a direction "B" and gets downward along the long holes 19a and 19b, so that the cartridge 101 stably stays in a predetermined position. Then, the magnetic tape is pulled out from the cartridge 101 to the position of the magnetic head, in order to write/read information onto/from the magnetic tape can be achieved. After this, the controller sets the loader tray 3 (the cartridge 101) back into the initial position thereof.

Even in this state, because the bottom portion 6a is not in contact with the recess 101a, the cartridge 101 is loosened.

As explained above, according to the structure of this embodiment, the release plate is moved toward or away from the stopper spring 6. If the release plate 7 is fixed in this state, the loading section can be set in a state where it is operated or in the other state where it is not operated. Hence, depending on the usage of the storage device, the loading section can be controlled to be operated or not.

According to this embodiment, depending on the usage of the storage device, it is not necessary that the loading section be attached/detached to/from the storage device. Hence, the loading section can be managed with ease. Therefore, those tasks and cost that might be required for attaching/detaching the loading section to/from the storage device are not necessary.

Further, the user can easily select as to whether the loading section should be used in the storage device, depending on the usage purpose of the storage device. This means that a single storage device can serve both as a library device and an autochanger device. According to his structure, the storage device can more freely be designed in accordance with the intention of the designer, thereby possibly realizing the general use of the storage device including the loading mechanism of this invention.

In the above embodiment, the explanations have been made to the case wherein the extending portions 7a and 7b push up the inclined portion 6b. However, the present invention can be realized, as long as the bottom portion 6a gets away from the recess 101a of the upon movement of the release plate 7.

In the above-described embodiment, the explanations have been made to the case wherein the stopper spring 6 which is formed from a plate spring is employed as an engagement member. However, the stopper spring 6 may be formed of a non-elastic material. In this case, also, the bottom portion 6a is engaged with the recess 101a, thereby holding the cartridge 101 tight.

In the above-described embodiment, the explanations have been made to the case wherein the extending portions 6c and 6d are formed in the stopper spring 6. However, the present invention can be realized, as long as the release plate 7 has a such a shape that it can give a push toward the inclined portion 6b. Thus, the extending portions 6c and 6d do not have to be formed in the stopper spring 6. Otherwise, the extending portions 7a and 7b do not have to be formed.

In the above-described embodiment, the long holes 14 and 16 and the embossed parts 18a and 18b are employed as position determination members, but are not necessarily formed in the loading mechanism 1 of the present invention. In addition, the long hole 15 and the screw 17 are used in the above-described embodiment. However, the long hole 15 many include two screws 17, or claws may be prepared so as to be engaged with each other, so as to stably fix the release plate 7.

In the above-described embodiment the explanations have been made to tie case where the storage medium is the magnetic tape. However, it is not limited to the magnetic tape, and the present invention can be adapted to an optical disk device which employs a cartridge, for example.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-117639 filed on Apr. 17, 2001, and including specification, claims, drawings and summary. The disclosure of the above Japanese Patent Application is incorporated herein by reference in its entirety.

What is claimed is:

1. A loading mechanism of a storage device, comprising:
   a loader tray loading a cartridge containing at least one storage medium, into said loading mechanism;
   an engagement member formed in an opening of said loader tray, said engagement member having a first end and a second end, said first end and said second end of said engagement member being fixed onto said loader tray, said engagement member having an engagement portion between said first end and said second end therof, said engagement portion being engaged with a top surface of said cartridge;
   a movable member being movable between a first position and a second position along the top surface of said loader tray, and urging said engagement member; and
   a fixing member selectively fixing said movable member in one of said first position and said second position,
   wherein said engagement portion touches said cartridge when said movable member is fixed in said first position, and said engagement portion is apart from said cartridge when said movable member is fixed in said second position.

2. The loading mechanism according to claim 1, wherein:
   said engagement member has an inclined portion disposed on the second side of said engagement member; and
   said movable member moves toward said engagement member, so as to push up said inclined portion of said engagement portion, thereby separating said engagement portion from said cartridge.

3. The loading mechanism according to claim 2, wherein said engagement member is bent in such a form having said engagement portion and said inclined portion.

4. The loading mechanism according to claim 2, wherein said engagement member comprises:
   an elastic material at least in a range from said engagement portion to the first end.

5. The loading mechanism according to claim 4, wherein said engagement member comprises:
   a plate spring.

6. The loading mechanism according to claim 2, wherein a pair of extending portions, to be engaged with said movable member are formed on the second end of said engagement member.

7. The loading mechanism according to claim 2, further comprising:
   a position determining member which enables said movable member to move only in one direction.

8. The loading mechanism according to claim 7, wherein said position determining member comprises:
   at least one long hole which is formed in said movable member and formed in parallel with a movement direction of said movable member; and
   at least one extending portion which is formed in said loader tray and is engaged with said at least one long hole.

9. The loading mechanism according to claim 2, wherein said fixing member comprises:
   at least one hole which is formed in said movable member in parallel with a movement direction of said movable member; and
   a screw which is affixed onto said loader tray and with which said movable member is held tight through said at least one long hole.

10. The loading mechanism according to claim 2, wherein said fixing member comprises:
    at least one hole which is formed in said movable member in parallel with a movement direction of said movable member; and
    a screw which is attached onto said loader tray and which is used for fixing said movable member through said at least one long hole.

11. The loading mechanism according to claim 1, wherein said engagement member is bent in such a form having said engagement portion and an inclined portion.

12. The loading mechanism according to claim 11, wherein said engagement member is generally V-shaped.

13. The loading mechanism according to claim 1, wherein said engagement member comprises:
    an elastic material at least in a range from said engagement portion to the first end.

14. The loading mechanism according to claim 13, wherein said engagement member comprises:
    a plate spring.

15. The loading mechanism according to claim 1, wherein a pair of extending portions, to be engaged with said movable member, are formed on the second end of said engagement member.

16. The loading mechanism according to claim 15, wherein a pair of extending portions, to be engaged with respectively the pair of extending portions of said engagement member, formed on the first end of said movable member.

17. The loading mechanism according to claim 15, wherein a pair of extending portions, to be engaged with respectively the pair of extending portions of said engagement member, formed on the first end of said movable member.

18. The loading mechanism according to claim 1, further comprising:
    a position determining member which enables said movable member to move only in one direction.

19. The loading mechanism according to claim 18, wherein said position determining member comprises:
    at least one long hole which is formed in said movable member and formed in parallel with a movement direction of said movable member; and
    at least one extending portion which is formed in said loader tray and is engaged with said at least one long hole.

20. The loading mechanism according to claim 19, wherein said position determining member comprises:
    two long holes formed in said movable member and formed in parallel with a movement direction of said movable member,
    wherein each of said two long holes comprises:
       a embossed portion for preventing the movable member from moving in any direction other than along said two long holes.

21. The loading mechanism according to claim 1, wherein said fixing member comprises:
- at least one hole which is formed in said movable member in parallel with a movement direction of said movable member; and
- a screw which is affixed onto said loader tray and with which said movable member is held tight through said at least one long hole.

22. The loading mechanism according to claim 1, wherein said fixing member comprises:
- at least one hole which is formed in said movable member in parallel with a movement direction of said movable member; and
- a screw which is attached onto said loader tray and which is used for fixing said movable member through said at least one long hole.

23. The loading mechanism according to claim 1, further comprising:
- two recessed sections formed on the top surface of said loading tray,
- wherein each of said recessed sections is positioned along side said opening.

24. The loading mechanism according to claim 23, further comprising:
- a pressing member formed in each of said recessed sections.

25. The loading mechanism according to claim 24, wherein said pressing members comprise:
- a bent spring comprising:
  - a first end secured to said loading tray; and
  - a second movable end which is pressed in and out of engagement with said cartridge to stably hold said cartridge inside of said loading tray.

26. The loading mechanism according to claim 24, further comprising:
- a fixing member which fixes said movable member in a predetermined position on said loader tray.

27. The loading mechanism according to claim 1, wherein said opening is disposed along a top surface of said loader tray.

28. A loading mechanism of a storage device, comprising:
- a loader tray which loads a cartridge containing at least one storage medium, said loader tray having an opening on a top surface through which said cartridge can be seen when loaded;
- an engagement member formed in said opening, said engagement member having a first side fixed onto said loader tray and an engagement portion that engages a top surface of said cartridge between the first side and a second side thereof; and
- a movable member which is movable toward and from said engagement member along the top surface of said loader tray, a movement of said movable member causing said engagement portion to one of engage and disengage said top surface of said cartridge.

29. A storage device having a loading mechanism comprising:
- a plurality of exterior panels defining a generally U-shaped casing; and
- the loading mechanism disposed inside of said mechanism, comprising:
  - a loader tray which loads a cartridge containing at least one storage medium into said loading mechanism, said loader tray having an opening from which said cartridge appears in a state wherein said cartridge is loaded inside of said loading mechanism, said opening disposed along a top surface of said loader tray;
  - an engagement member which is formed in said opening, comprising:
    - a first side fixed onto said loader tray; and
    - an engagement portion to be engaged with a top surface of said cartridge between the first side and a second side thereof; and
  - a movable member which is movable toward and from said engagement member along the top surface of said loader tray, and causes said engagement portion to be moving toward said engagement member so as to be separated from said cartridge.

* * * * *